(No Model.)
F. H. VAN HOUTEN.
WOOD MOLDING MACHINE.
No. 480,443. Patented Aug. 9, 1892.
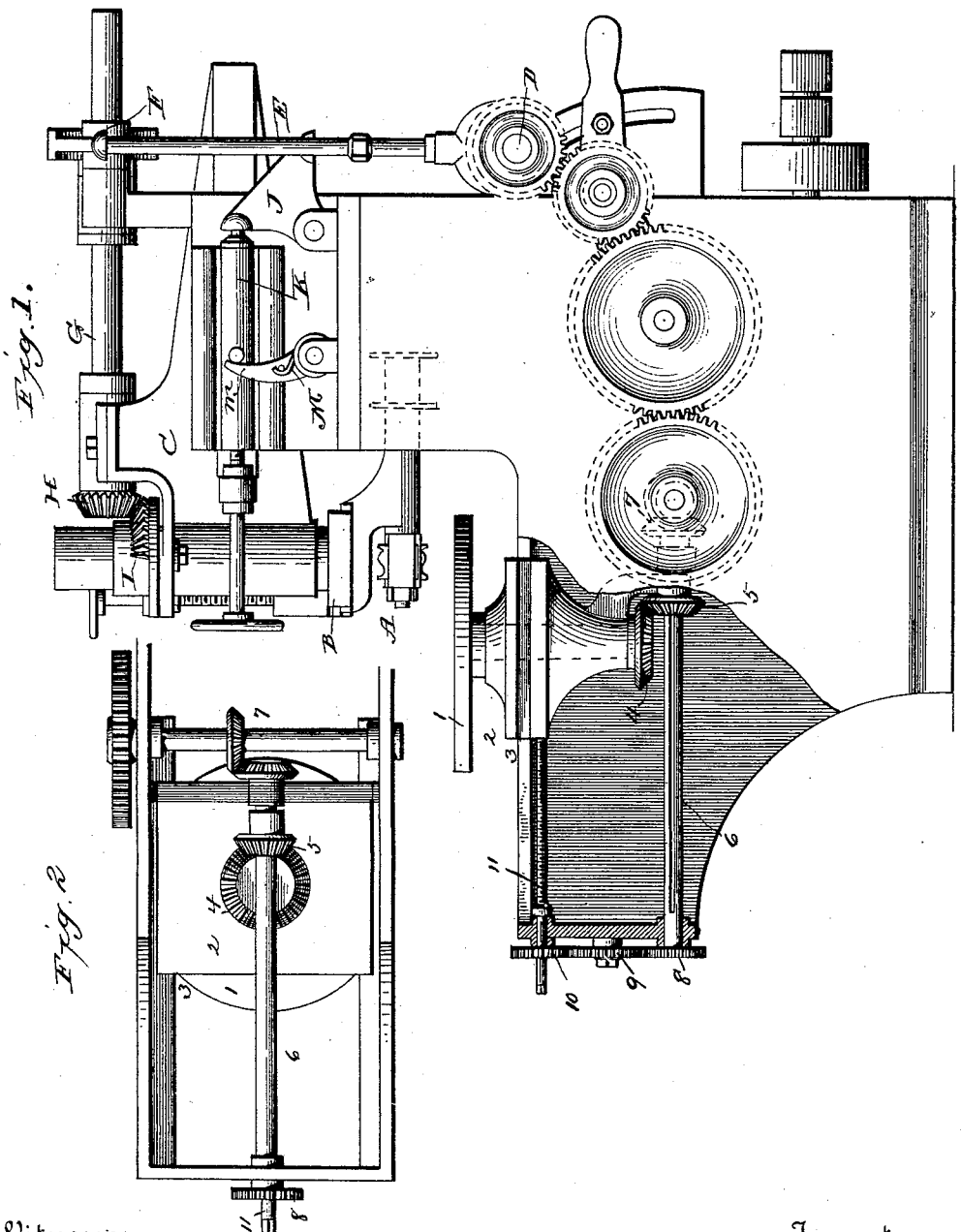
Witnesses
E. L. Smith
Thomas Durant.
Inventor
Frank H. Van Houten,
By his Attorneys
Church & Church

UNITED STATES PATENT OFFICE.

FRANK H. VAN HOUTEN, OF MATTEAWAN, NEW YORK, ASSIGNOR TO CHARLES L. GOEHRING, OF ALLEGHENY, PENNSYLVANIA.

WOOD-MOLDING MACHINE.

SPECIFICATION forming part of Letters Patent No. 480,443, dated August 9, 1892.

Application filed May 26, 1890. Serial No. 353,159. (No model.)

*To all whom it may concern:*

Be it known that I, FRANK H. VAN HOUTEN, of Matteawan, in the county of Dutchess and State of New York, have invented certain new and useful Improvements in Wood-Molding Machines; and I do hereby declare the following to be a full, clear, and exact description of the same, reference being had to the accompanying drawings, forming a part of this specification, and to the figures and letters of reference marked thereon.

This invention relates to improvements in that class of woodworking-machines wherein an oscillatory reciprocating cutter-head is employed and caused to traverse the face of the material as the latter is advanced or fed by suitable mechanism to form a series of curves or other figures; and it consists in the novel and improved mechanism for feeding or controlling the position of the material while being acted upon by the oscillatory reciprocating cutter.

In the accompanying drawings, Figure 1 is a side elevation, partly in section, of a machine with the present improvements applied thereto. Fig. 2 is a bottom plan view of the feeding devices.

Similar letters and numbers of reference in the two figures indicate the same parts.

The cutting mechanism is of the type or variety in which a rotating cutter A is supported upon an oscillating frame or stem B, attached to a reciprocating slide or carriage C. The oscillating motions of the frame or stem B are produced by a cam on cam-shaft D, operating through rod E, segment F, and a gear (not shown) on shaft G, the latter provided with a gear H, engaging a toothed collar I on said stem. The reciprocations of the slide or carriage C are effected through a cam on shaft D, a rod-engaging bell-crank lever J, and a slide K, interposed between said lever and an adjusting-screw on the slide or carriage. A spring M operates through an arm *m* on the slide K, to retract the slide C.

All the parts described constituting the cutting mechanism are substantially the same as shown in another application filed herewith, Serial No. 353,160, and are not claimed herein.

Machines of this kind as heretofore generally constructed have been provided with feeding mechanism for advancing the material in a straight line beneath the cutter, and the result has been that the successive figures produced by the action of the oscillatory reciprocating cutter were all formed in the same plane or on a common base-line. Thus if the actuating devices were set to produce a given figure each succeeding figure in the series would be in the same plane as compared with the other figures.

One object of the present invention is to enlarge the capacity of the machine, so that the successive figures may be formed in curved or spiral lines, and this I accomplish by shifting the position of the material—that is to say, changing or varying the line of feed motion while the oscillatory reciprocating cutter is in action and operating to produce the given figures. With this end in view the bed-plate 1, upon which the material is placed and securely held, is pivotally supported upon a movable carriage 2, the latter supported in ways 3, so as to be movable toward and from the cutter. The pivot of the bed-plate extends below the bed-plate and carries a gear 4, which is engaged by a gear 5, capable of moving longitudinally of shaft 6, but connected to the latter by a spline. Shaft 6 is driven from one of the shafts of the cutting-machine through a suitable train of gearing 7, and it carries a pinion 8, engaging an idler 9 in gear with pinion 10 on screw 11, the latter engaging the carriage 2. By removing the idler 9 or otherwise disconnecting the shaft 6 from the screw or other devices for effecting the reciprocating motion of the carriage the bed-plate or table will be rotated upon its axis, carrying the material in a curved or circular path beneath the oscillatory reciprocating cutter, so that the successive figures will be formed on a curved base-line, and as the movements of the table are controlled by the same driving mechanism which controls the movements of the cutter the several successive figures will all be of the same form and dimensions.

The figures may be formed on concentric circular lines or arcs by shifting the carriage in or out after each line of figures has been formed, or the lines of figures may be formed on different curves, one within another, by shifting the position of the carriage and of the material upon the bed-plate. In this way several different designs or series of figures may be formed on the same board, or the sections of a composite figure may be formed on separate boards.

By connecting the screw to the shaft 6 a compound rotary and reciprocating motion will be given the bed-plate and the material lying thereon, in which case the series of figures as produced by the oscillatory cutter will be formed in a spiral.

In illustrating my invention I have shown it in one of its simplest forms of embodiment, but do not wish to be understood as restricting myself thereto, as many other arrangements of driving mechanism may be devised for controlling and effecting the movements of the table or work support relatively to the oscillatory reciprocating cutter, the gist of my present invention residing in the employment of automatic devices for shifting the material operated upon by the oscillatory reciprocating cutter, whereby, without interfering with the action of the cutter in producing a predetermined pattern or design, the line upon which successive figures are formed is varied from a right line.

Having thus described my invention, what I claim as new is—

1. In a machine such as described, the combination, with an oscillatory reciprocating cutter-head whose arbor or axis of rotation is transverse to its axis of oscillation and in a plane substantially parallel with the plane of reciprocation, of a work support or table pivotally supported to turn about an axis substantially parallel with the axis of oscillation of the cutter-head, said table being mounted upon a base or support guided to travel in a plane substantially parallel with the plane of reciprocation of the cutter-head, substantially as described.

2. In a machine such as described, the combination, with an oscillatory reciprocating cutter-head, of a work support or table pivotally supported to turn about an axis parallel with the axis of oscillation of the cutter-head but to one side thereof, a support for said table, guided to move in a plane substantially parallel with the plane of reciprocation of the cutter-head and actuating devices or driving mechanism common to the cutter-head, and a table for controlling the oscillatory and reciprocating motions of each and preserving the proper relations the one to the other, substantially as described.

3. In a machine such as described, the combination, with an oscillatory reciprocating cutter, of a table or work support extending beneath the cutter and pivotally supported upon a laterally-movable carriage, with devices for automatically rotating the table and moving the carriage, substantially as described.

4. In a machine such as described, the combination, with the oscillatory reciprocating cutter, of the traveling carriage, the table pivotally supported upon said carriage, the screw engaging said carriage, the driving-shaft and gearing intermediate the driving-shaft and table, and the driving-shaft and adjusting-screw for simultaneously rotating the table and shifting the carriage, substantially as described.

FRANK H. VAN HOUTEN.

Witnesses:
   THOMAS DURANT,
   A. KELLY.